United States Patent [19]

Rolstad et al.

[11] 4,425,297

[45] Jan. 10, 1984

[54] GAMMA RAY THERMOMETER FOR BOILING WATER REACTOR

[75] Inventors: Erik Rolstad, Halden, Norway; Robert D. Smith, Bethesda, Md.

[73] Assignee: Scandpower, Inc., Bethesda, Md.

[21] Appl. No.: 276,526

[22] Filed: Jun. 23, 1981

[51] Int. Cl.³ .............................................. G21C 17/00
[52] U.S. Cl. ...................................... 376/247; 374/30
[58] Field of Search .......................... 376/247; 374/30; 73/1 F

[56] References Cited

U.S. PATENT DOCUMENTS

| | | | |
|---|---|---|---|
| 3,599,474 | 8/1971 | Brown et al. | 374/30 |
| 3,716,450 | 2/1973 | Lions | 376/247 |
| 3,724,268 | 4/1973 | Kuwabara | 376/247 |
| 4,298,430 | 11/1981 | Rolstad et al. | 376/247 |
| 4,313,792 | 2/1982 | Smith | 376/247 |

FOREIGN PATENT DOCUMENTS 2018421  10/1979  United Kingdom .

OTHER PUBLICATIONS

IEEE Meeting, Wash. D.C. (10/78), Gamma Thermometer for LWR, Leyse et al., pp. 1–9.
R. H. Leyse and R. D. Smith, "Gamma Thermometers for Light Water Reactors", IEEE Transactions on Nuclear Science, NS-26, Feb. 1979.

*Primary Examiner*—Sal Cangialosi
*Attorney, Agent, or Firm*—Eric P. Schellin

[57] ABSTRACT

The elongated monolithic radiation absorbing body of a gamma ray sensor has its entire external surface exposed to coolant for establishing a uniform heat sink temperature throughout. Cold junction regions are formed in portions of the elongated body of reduced cross-sectional area sufficient to produce measurable signal levels from a differential temperature thermocouple. A removable low melting filler in the reduced cross-sectional portions of the body enable accurate electrical calibration of the sensor.

4 Claims, 7 Drawing Figures

GAMMA RAY THERMOMETER FOR BOILING WATER REACTOR

BACKGROUND OF THE INVENTION

This invention relates generally to in-core, gamma ray heat sensing means for determining local power generation in a nuclear reactor.

According to prior copending application, now U.S. Pat. No. 4,298,430, owned in common with the present application by the same assignee, several gamma sensor assemblies for local power measurement are disclosed wherein an elongated monolithic body of gamma ray heated material mounts thermocouples for measuring temperature differentials produced internally in the elongated body at a plurality of axially spaced measurement zones. The temperature differential is a direct function of the average volumetric heat flow rate for the measurement zone which is in turn directly related to local power generation. The disclosure in U.S. Pat. No. 4,298,430 is hereby incorporated herein by reference. Other related, prior copending applications, now U.S. Patents, owned in common herewith are U.S. Pat. Nos. 4,313,792 and 4,356,061.

In U.S. Pat. No. 4,298,430, aforementioned, the claims are directed to gamma ray sensors within which axial heat flow patterns are established to produce the temperature differential measurements for each measurement zone in a pressurized water type of nuclear reactor where space for insertion of the sensor is restricted to 7.5 mm. for example, to limit the outer diameter of the elongated sensor body. Such temperature differentials are produced at each measurement zone by a thermally resistive region or gap in the body enclosed by an outer heat sink tube in thermally conductive relation to the constant outer diameter portion of the elongated sensor body. In such an arrangement, the resulting axial heat flow pattern is such as to render the thermocouple junction in the high thermal resistance region hot and the junction in spaced adjacency thereto, cold. The high thermal resistance gap has an axial length which is directly related to the differential temperature signal output of the sensor, disregarding gap heat losses and assuming a uniform heat sink temperature for the sensor. Further, the outer diameter of the sensor body has no direct affect on the level of the signal output. It was therefore, believed that only with a sensor of the type having the axial heat flow pattern could a suitable signal output level be obtained despite installation space limitations, by appropriate selection of the axial gap length. However, the axial heat flow type of sensor does have signal reliability problems because of axial gap heat losses resulting from deterioration of the high thermal resistance in the axial gap and deviations in heat sink temperature as a result of poor contact developed between the sensor body and the outer heat sink tube.

It is therefore, an important object of the present invention to provide a gamma sensor for measuring local power generation in a nuclear reactor, that is more reliable with respect to signal error and yet provide an adequate output signal level as well as to exhibit the necessary physical strength under installational conditions. An additional object is to provide such an improved gamma sensor which retains the attribute of direct electrical calibration.

SUMMARY OF THE INVENTION

In accordance with the present invention, a gamma sensor is provided wherein controlled radial heat flow paths are established within the elongated gamma ray heated body by direct exposure of its external surface throughout to coolant, producing a uniform heat sink temperature at the external surface both along the outer diameter portions and along the reduced cross sectional portions. Radial heat flow within each measurement zone occurs so that the reduced diameter portions are colder than the portions of the body adjacent thereto, producing a differential temperature signal in the thermocouple device that is a direct function of only the outer diameter of the sensor body. Thus, because of the larger available space for the sensor within a boiling water type reactor, temperature differentials of up to 22° C. may be obtained by use of larger diameter sensor bodies, as compared to 4° C. for sensors of the radial heat flow type fitted to the smaller available space in a pressurized water type reactor.

The radial heat flow type of sensor of the present invention is not only similar in construction, but avoids the disadvantages of the axial heat flow type aforementioned, with respect to deterioration of the thermal resistance of the enclosed axial gap and development of poor contact between the heater body and outer heat sink tube. To insure structural integrity for the radial heat flow type of sensor body, having no outer heat sink tube, thin metal fins are provided axially across the annular space at the reduced diameter portions of the sensor body. The material and dimensions of such fins is such as to have a negligible affect on the differential temperature signal produced.

One of the advantages of the gamma ray type sensors emphasized in the prior copending application aforementioned, is the ability to effect electrical calibration by conducting electrical current longitudinally through the elongated monolithic body of the sensor to internally generate heat simulating the heat internally generated during sensor use by gamma radiation. However, since the reduced diameter portions of the sensor body have higher electrical resistance and therefore produce heat at a higher rate than the larger diameter portions of the body, the electrical heating effect would be the reverse of the gamma heating effect in the axial heat flow type of sensor. In order to preserve the direct electrical calibration attribute for the radial heat flow sensor, certain calibration measures are taken in accordance with another aspect of the present invention to substantially render the rate of electrical heat generation constant throughout the sensor body.

During calibration, the annular spaces formed at the reduced diameter portions of the sensor body are partially filled with a predetermined quantity of low melting point fillers of high thermal and electrical conductivity. The quantity of filler in such as to equalize the voltage drop per length across the reduced and major diameter portions of the sensor body. The high thermal conductivity of the filler is necessary to render any additional temperature drop along radial paths therethrough to be negligible during calibrating heat generation. After calibration, the filler is melted off.

BRIEF DESCRIPTION OF DRAWING FIGURES

DETAILED DESCRIPTION OF PREFERRED EMBODIMENT

Figure 1:
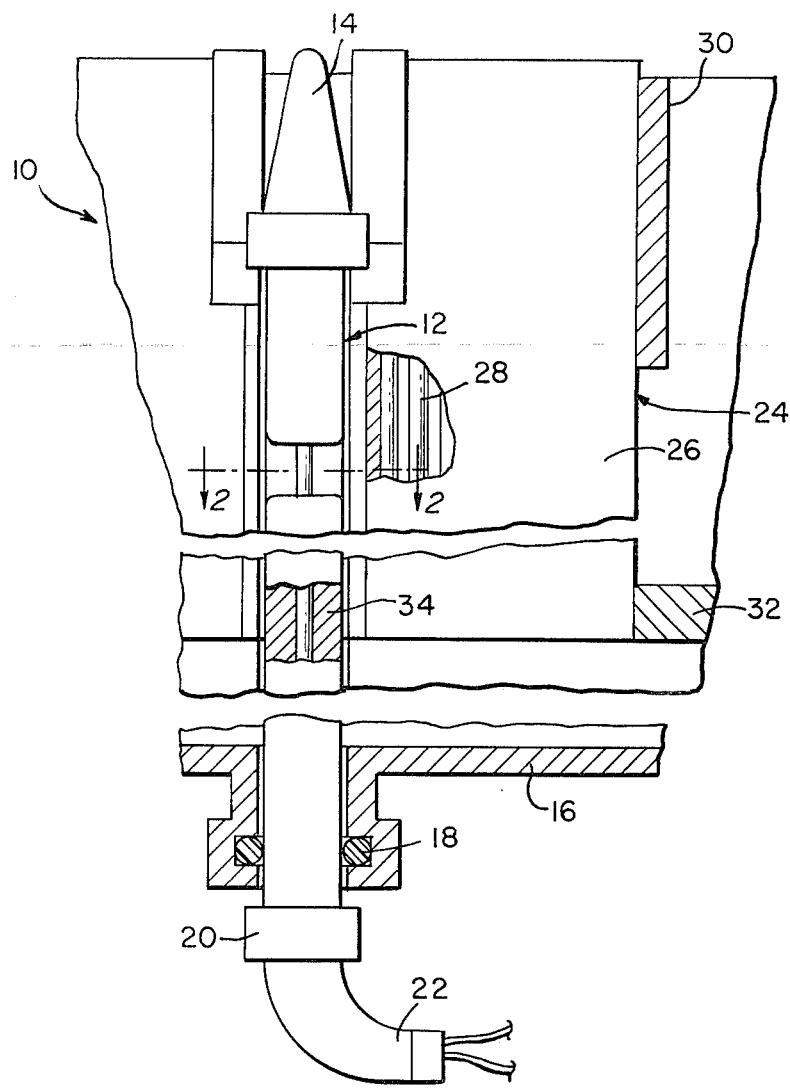
FIG. 1 is a partial and somewhat simplified side section view through a boiling water reactor installation for a gamma ray sensor constructed in accordance with the present invention.

Referring now to the drawings in detail, FIG. 1 illustrates a typical boiling water reactor installation, generally referred to by reference numeral 10, for a gamma radiation type of sensor, generally referred to by reference numeral 12. The sensor 12 is inserted into the reactor from the top by means of a gripping cone 14, in a manner already known in the art. When inserted, the lower end of the sensor projects from the bottom wall 16 of the reactor vessel through a high pressure gland 18 and is connected by means of a pin socket coupling 20 to a signal cable 22 extending to the instrumentation site for the reactor.

The sensor 12 is vertically positioned as shown between adjacent fuel assemblies 24 having vertically enlongated channels 26 enclosing bundles of fuel rods 28. These fuel assemblies extend vertically within the reactor vessel between a top fuel guide structure 30 and a lower grid 32 below which the sensor projects. Some of the fission products from the fuel rods during power generation, in the form of gamma radiation is detected by the sensor 12 at a plurality of vertically spaced measurement zones. In practice, there are between four and ten of such measurement zones from which local power generation measurements are obtained through each sensor. The outer diameter of the sensor is made as large as practically possible for the available space between the adjacent fuel assemblies, and is externally exposed to a body of coolant within the reactor vessel in order to establish a uniform heat sink temperature therefor.

Figure 2:
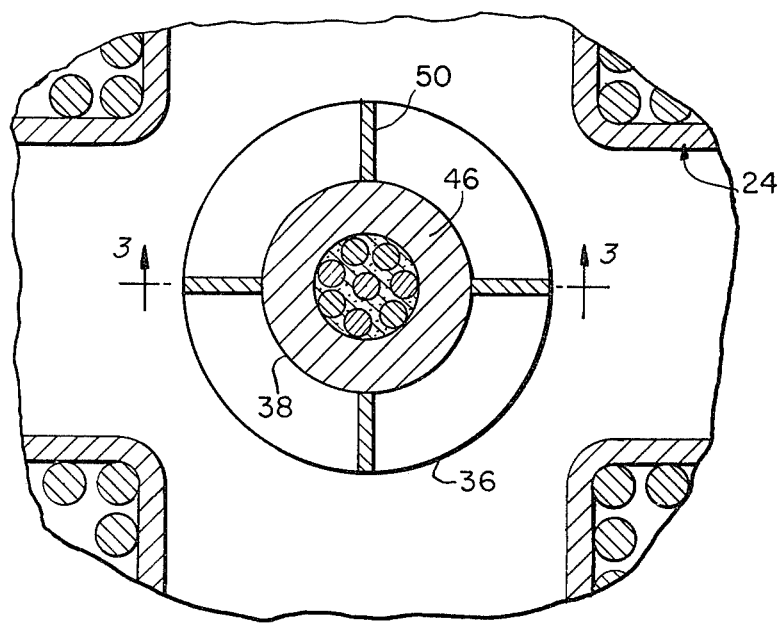
FIG. 2 is an enlarged transverse section view taken substantially through a plane indicated by section line 2—2 in FIG. 1.
Figure 3:
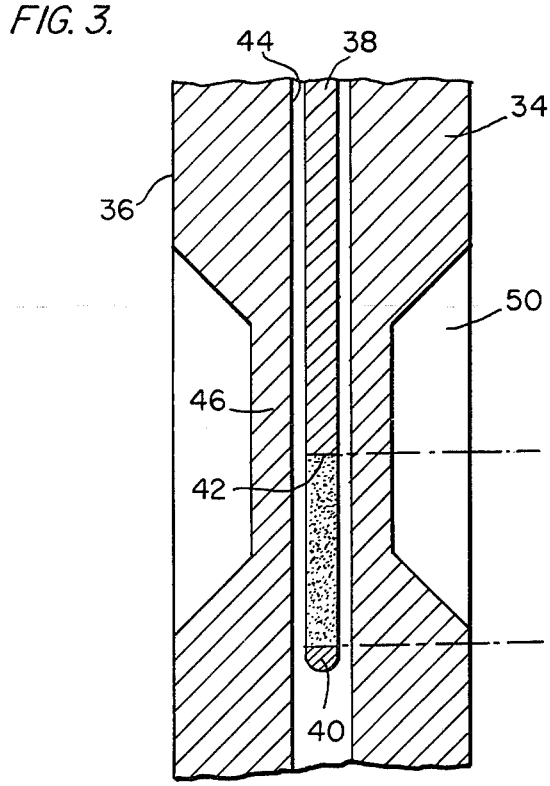
FIG. 3 is a side section view taken substantially through a plane indicated by section line 3—3 in FIG. 2.

As more clearly seen in FIGS. 2 and 3, showing an enlarged portion of the gamma sensor 12, an elongated monolithic gamma radiation absorbing body 34 is provided made of a material such as stainless steel No. 316 or zircaloy which generates heat when exposed to gamma radiation, without any change in its properties. The heat so generated flows radially outward to the external surface 36 of the body 24 which is maintained at a heat sink temperature by the coolant, such as water, in direct contact therewith throughout. A plurality of double junction thermocouple cables 38 is mounted internally within the body 34 and is connected to the instrument cable 22, in order to measure differential temperatures at the axially spaced measuring zones, one of which is shown in FIGS. 2 and 3. The sensor, therefore, has associated therewith differential thermocouple junctions 40 and 42 for each measuring zone as shown in FIG. 3.

The thermocouple cables are mounted within a central bore 44 formed in the elongated body 34 through which its longitudinal axis extends. The body is generally cylindrical and of a constant diameter along a major portion thereof interrupted at reduced cross-sectional area portions 46 located within each measuring zone. The axial interruptions in the otherwise constant diameter of the body at the reduced diameter portions 46 form cold regions within which the thermocouple junctions 42 are located. As a result of such configuration, the temperature gradient in the measurement zone follows the curve 48 shown in FIG. 4.

Figure 4:
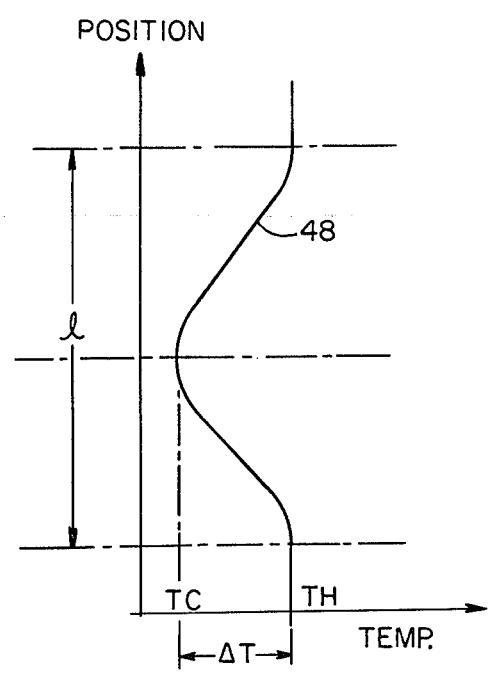
FIG. 4 is a graphical illustration of the temperature gradient associated with a portion of the sensor shown in FIG. 3.

As shown in FIGS. 3 and 4, the cold junction 44 is located approximately midway within the cold region surrounding the reduced diameter portion 46. The hot junction 40 adjacent the tip of the thermocouple cable 38 is aligned with the constant diameter portion of the body 34 adjacent to the reduced diameter portion 46 in axially spaced relation to cold junction 42. Thus, temperature measurements made through the thermocouple cable will be influenced by one-dimensional, radial heat flow through the body 34 during reactor power operation at the axial locations of the thermocouple junctions 40 and 42. The temperature differential ($\Delta T$) between the interior of body 34 and the heat sink surface for such a radial heat flow arrangement is approximately $\Delta T = (9r^2/4K)$, as compared to the equation applicable to an axial heat flow arrangement; $\Delta T = (qL^2/8K)$.

In the foregoing equations, (q) is the rate of heat generated by gamma ray absorption, (r) is the radius of the major portion of the body, (k) is its thermal conductivity and (L) is the axial length of the reduced diameter portion of the body. Thus, for both pressurized and boiling water types of reactors, the temperature differential signal obtained from an axial flow type sensor is a function of axial length of the reduced diameter portion of the heater body of the sensor. When utilizing a radial heat flow type of sensor in accordance with the present invention, the differential temperature signal obtained is a function of the outer diameter or radius (r) of the sensor body. Accordingly, by use of a larger diameter sensor for the larger space available in a boiling water reactor as compared to a pressurized water reactor, a larger differential signal output is theoretically possible. In practice, the differential temperature measurement through the raidal heat flow sensor is up to 4° C. in a pressurized water reactor and is up to 22° C. in a boiling water reactor.

The foregoing equations are approximate in that they omit a negligible factor depending on the radius of the reduced diameter portion of the sensor body and disregard those heat losses which are mimimal only for the radial heat flow type of sensor. Such heat losses are avoided because the entire external surface of the body 34 is in direct thermal contact within the coolant establishing a uniform heat sink temperature throughout. Thus, more accurate and reliable differential signal measurement of local power generation is achieved. The only drawback may reside in the limitation on the magnitude of the temperature differential imposed by the more restricted space for the sensor in a pressurized water reactor. Whether such a drawback is significant will depend on the signal noise level to be encountered.

In the design and construction of the sensor 12, the dimensions of the reduced diameter portions 46 are not significant, as hereinbefore demonstrated, in so far as signal level is concerned, but do affect the structural strength of the sensor. In order to strengthen the sensor and offset the weakening effect of the reduced diameter portions, radial fins 50 are provided as more clearly seen in FIG. 2. These fins are made of material having a high structural strength and a high thermal conductivity so as to have a negligible affect on heat sink temperature and the radial flow of heat.

Figure 5:
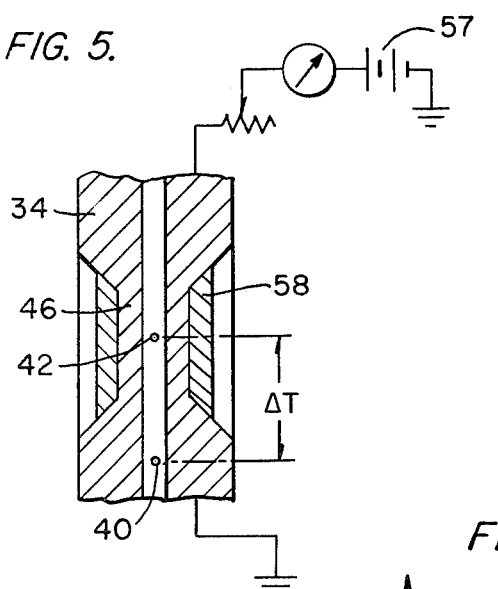
FIG. 5 is a partial longitudinal section view of a sensor prepared for electrical calibration prior to installation.
Figure 6:
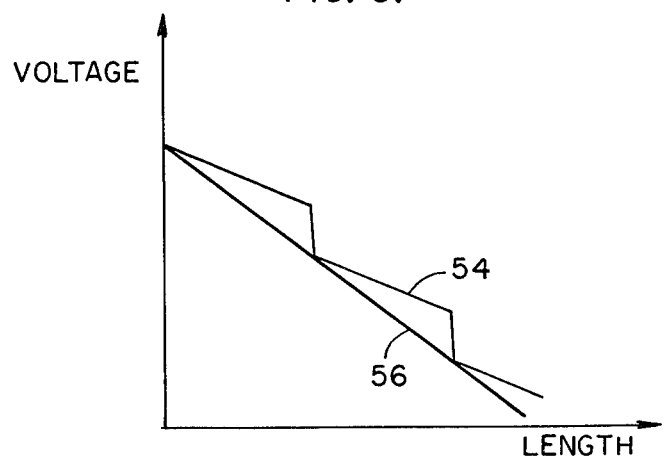
FIG. 6 is a graphical illustration of the voltage drop characteristics along the sensor body during electrical calibration.

The accuracy of the measurements obtained through the sensor 12 will also depend on its calibration before installation. Calibration is effected by passing an electric current longitudinally through the sensor body 34 by connection to an electrical power source 52, as diagrammed in FIG. 5, causing internal electrical heating of the body. A non-uniform volt drop ordinarily occurs along the length of the sensor body as indicated by curve 54 in FIG. 6, because of the higher electrical resistance of the reduced diameter portions 46. The volt drop is therefore modified to render it uniform as indicated by curve 56, by establishing current paths in parallel with the reduced diameter portions 46 of the body during electrical heating for calibration purposes. Toward that end an annular filler ring 58 is fitted about the reduced diameter portions of the body as shown in FIG. 5. The filler is made of a material having high thermal and electrical conductivity as well as a low melting point temperature. Thus, silver solder, etc., may be suitable. The quantity of the filler utilized in such as to equalize the volt drop per unit length of the reduced diameter portion 46 with the major diameter portions to obtain the uniform volt drop curve 56 shown in FIG. 6. The high conductivity of the filler will avoid any additional heating affect on the body 34. The low melting point for the filler will enable it to be readily removed by melting after calibration is completed.

Figure 7:
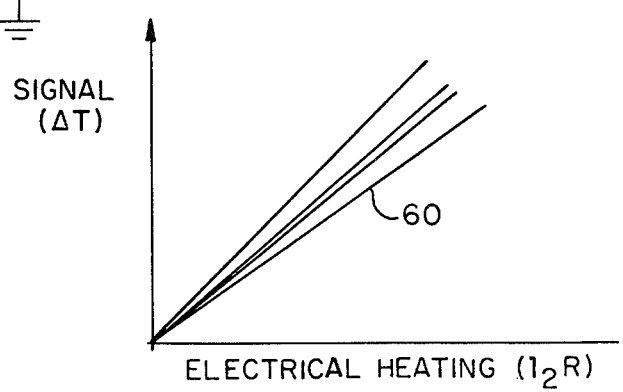
FIG. 7 is a graph of the calibration factor curves obtained by calibration in accordance with the present invention.

Once the body 34 is electrically heated after being prepared as herein described, a differential temperature signal ($\Delta T$) is obtained across the thermocouple junctions 40 and 42 as shown in FIG. 5 and the heating current varied in order to plot the signal ($\Delta T$) versus the heating effect of the current as indicated by the calibration curves 60 in FIG. 7. The slopes of these curves plotted for each sensor individually, represent sensitivity factors in terms of °C. per watt, per gram. In practice, the sensitivity factors for the radial heat flow sensors is between 4 and 40° C./watt/gram.

What is claimed is:

1. A device for measuring local power generation within a fuel assembly of a nuclear reactor comprising:
    a gamma radiation absorbing body elongated along a longitudinal axis and made of heat conductive and electrically conductive material;
    elongated thermocouple means mounted within said body for establishing axially spaced differential temperature sensing junctions therein at each of a plurality of local measuring zones;
    coolant in external contact with said body throughout for establishing a uniform heat sink temperature extenally of said elongated body for producing radial heat flow paths from said junctions of said thermocouple means;
    reduced diameter portions of said elongated body at each of said local measuring zones for establishing thermal and electrical deviations in resistance of the elongated body producing a differential temperature signal across said junctions of said thermocouple means; and strengthening fins made of high thermally conductive material extending radially from said reduced diameter portion of said elongated body.

2. A device for measuring local power generation within a nuclear reactor comprising:
    a gamma radiation absorbing body elongated along a longitudinal axis having an external heat sink surface to which radial heat flow paths are established at axially spaced locations along the longitudinal axis by a reduced cross-sectional area portion thereof, and having a central bore within which is mounted
    a thermocouple having a cold junction at one of said spaced locations alligned with said reduced cross-sectional area portion and hot junction closely spaced therefrom;
    means for maintaining coolant in contact with said external heat sink surface; and
    strengthening fins made of high thermally conductive material extending radially from the reduced cross-sectional area portion.

3. In a method of calibrating a gamma sensor having an elongated monolithic body of electrically conductive material within which heat flow paths are established from axial spaced internal points between which a temperature differential is produced by a reduction in cross-sectional area of a portion of the body, the steps of: adding an electrically conductive filler to the reduced cross-sectional area portion of the body prior to conducting heating current through the body to render the voltage drop per length uniform; conducting electrical heating current longitudinally through the body for internal heating thereof; measuring the temperature differential across said axially spaced points; varying the heating current to determine the relationship between heat generated within the body and the measured temperature differential; and removing the filler from the body upon completion of calibration.

4. The method of claim 3 wherein said filler is made of a low melting temperature material to effect said removal thereof by melting.

* * * * *